«12» United States Patent
Hiai et al.

US008206595B2

(10) Patent No.: US 8,206,595 B2
(45) Date of Patent: Jun. 26, 2012

(54) METHOD OF RECOVERING SILVER USING ANION-EXCHANGE RESIN

(75) Inventors: Hiroshi Hiai, Hitachi (JP); Yoshifumi Abe, Hitachi (JP)

(73) Assignee: JX Nippon Mining & Metals, Tokyo (JP)

( * ) Notice: Subject to any disclaimer, the term of this patent is extended or adjusted under 35 U.S.C. 154(b) by 701 days.

(21) Appl. No.: 12/400,636

(22) Filed: Mar. 9, 2009

(65) Prior Publication Data

US 2010/0116093 A1    May 13, 2010

(30) Foreign Application Priority Data

Nov. 13, 2008  (JP) ................................ 2008-291222

(51) Int. Cl.
*B01D 15/04* (2006.01)
*C22B 3/00* (2006.01)
*C22B 3/04* (2006.01)
*C22B 3/06* (2006.01)
*C22B 11/06* (2006.01)

(52) U.S. Cl. .......... 210/684; 75/744; 210/660; 210/672; 210/679; 210/681; 210/683

(58) Field of Classification Search .................. 210/638, 210/660, 661, 663, 670, 681, 683, 684, 688, 210/691
See application file for complete search history.

(56) References Cited

U.S. PATENT DOCUMENTS

| 5,246,591 | A | * | 9/1993 | Abolt et al. ................... 210/656 |
| 5,256,187 | A | | 10/1993 | Gefvert |
| 5,487,819 | A | | 1/1996 | Everett |
| 5,620,585 | A | | 4/1997 | Dadgar et al. |
| 2004/0118249 | A1 | | 6/2004 | Asano et al. |

FOREIGN PATENT DOCUMENTS

| AU | 2003287781 B2 | 7/2004 |
| GB | 355565 | 9/1930 |
| JP | 2857930 B2 | 2/1999 |
| JP | 2001-316736 A | 11/2001 |

OTHER PUBLICATIONS

A. P. Paiva; Solvent Extraction and Related Studies on Silver Recovery from Aqueous Solutions; Separation Science and Technology; vol. 28; No. 4; pp. 947-1008; 1993.
Examiner's first report dated Nov. 24, 2011 issued in application No. AU 2009238234.
FX McGarvey; Removal and Recovery of Metals by Ion Exchange; Symbrion Chemicals, Inc. 23rd Annual Liberty Bell Corrosion Course 4; pp. 1-9; 1985.
M. Knothe et al.; Studies on the adsorption of silver from cyanide solutions by functional polymers; Solvent Extraction and Ion Exchange; vol. 9; No. 4; pp. 677-696; 1991.
M. R. Davis et al.; An engineering cost study: CIS vs RIS with AuRIX 100; Randol Gold Forum 99, Denver; 1999.
P. A. Riveros et al.; Kinetic aspects of the ion exchange extraction of gold, silver, and base metal cyano complexes; Solvent Extraction and Ion Exchange; vol. 6; No. 3; pp. 479-503; 1988.
P. A. Riveros; The extraction of silver from cyanide solutions with ion exchange resins; Solvent Extraction and Ion Exchange; vol. 3; No. 3; pp. 357-375; 1985.
Tamas Kekesi et al.; Anion-Exchange Separation in Hydrochloric Acid Solutions for the Ultrahigh Purification of Cobalt; Metallurgical and Materials Transactions B; vol. 32B; pp. 573-582; 2001.
Tamas Kekesi et al.; Ultra high purification of copper chloride solutions by anion exchange; Hydrometallurgy, 1997; vol. 45; pp. 345-361.
Y. Wasada; Purification Process and Characterization of Ultra High Purity Metals: Application of basic science to metallurgical processing; Section 3.8; The Purification of Copper; pp. 89-97; 2002.

\* cited by examiner

*Primary Examiner* — Jerry Lorengo
*Assistant Examiner* — Jared Wood
(74) *Attorney, Agent, or Firm* — Birch, Stewart, Kolasch & Birch, LLP (57) ABSTRACT

The present invention provides a method of recovering silver safely and efficiently from a chloride or bromide bath containing various metals. Specifically, a method of recovering silver from a hydrochloric acid solution containing alkali and/or alkaline earth metal chloride, silver, copper and iron ions, comprising the steps of: (1) bringing the solution into contact with a strong-base anion-exchange resin to adsorb silver, copper, and iron on the anion-exchange resin; (2) then washing the anion-exchange resin with water to remove the adsorbed copper and iron; and (3) then bringing the ion-exchange resin into contact with a hydrochloric acid solution to elute the adsorbed silver, is provided.

20 Claims, 4 Drawing Sheets

METHOD OF RECOVERING SILVER USING ANION-EXCHANGE RESIN

FIELD OF THE INVENTION

The present invention relates generally to recovery of silver using anion-exchange resin. More particularly, the invention relates to a method of recovering silver in a solution containing alkali metal and/or alkaline earth metal chloride. The invention also relates to a method of recovering copper through leaching of copper from ore or concentrate in a chloride bath and separation of copper by solvent extraction.

BACKGROUND OF THE INVENTION

Normally, copper sulfide ore contains a small amount of silver. The silver is recovered in a smelting process by a common method that processes copper sulfide ore at a high temperature exceeding 1000° C.: The copper sulfide ore containing silver is processed at a high temperature exceeding 1000° C. together with iron sulfide and silicate ore so as to form $Cu_2S$ called matte, and slag composed essentially of iron oxide and silicate and containing impurities. The matte is reduced at a high temperature into low-purity metal copper called blister copper. The blister copper is then refined through electrolysis into metal copper having a purity of 99.99% or more.

Silver contained in copper sulfide ore migrates in company with copper in the production process of metal copper. In the electrolysis, the silver is recovered with other noble metals in the copper electrolytic precipitate, which is processed as follows: The precipitate is oxidized at a high temperature in a dry furnace to separate crude silver containing noble metals from the slag containing lead oxide. A silver anode is made from the crude silver and is electrolyzed to recover high-purity silver. The process is disclosed in Japanese Unexamined Patent Application Publication No. 2001-316736.

A disadvantage of this method is that a high temperature exceeding 1000° C. is required. Another disadvantage is that the process to recover silver requires many steps because silver is a byproduct of metal copper production.

Hydrometallurgy is a countermeasure that overcomes these disadvantages, as is described in co-pending Japanese Patent Application No. 2008-084597, which has not been published yet. The method of recovering copper and gold from ore described in this application comprises: (1) a copper leaching step of preparing a leaching solution containing cuprous ions and cupric ions by adding raw material sulfide ore to a first acidic solution containing alkali or alkaline earth metal chloride and bromide and copper and iron chlorides or bromides, and blowing air into the acidic solution under atmospheric pressure at a temperature below the boiling point of the solvent at least for a period of time; (2) a solid-liquid separation step of separating the leached raw material through solid-liquid separation; (3) an air-oxidizing step of blowing air into the solution after the solid-liquid separation to oxidize at least part of cuprous ions to cupric ions, to oxidize iron leached out during the copper leaching step, and to coprecipitate impurities leached out of the raw material during the copper leaching step, followed by precipitation separation; (4) a copper extraction step of extracting the copper through a process such as solvent extraction from the solution after the precipitation separation of the air-oxidizing step; (5) a gold recovery step of leaching gold from the residue separated in the solid-liquid separation step by adding the residue to a second acidic solution containing alkali or alkaline earth metal chloride and bromide and copper and iron chlorides or bromides and blowing air into the solution under atmospheric pressure at a temperature below the boiling point of solvent in the presence of iron.

The method can recover copper and gold through a leaching process at a high leaching ratio for copper sulfide ore in a chloride solution bath using only air with no special oxidizing agent. In this regard, leaching of copper in a chloride solution bath is advantageous compared to that in a sulfate solution bath. In such a case, silver is also eluted in the leaching solution.

Although the dissolution of the silver is not described in the application, silver is dissolved in the leaching process in the chloride or bromide bath containing copper and iron, so that the solution after extraction contains silver in addition to copper. Accordingly, it is desirable to recover the silver dissolved in the solution after extraction.

Japanese Patent 2857930 discloses a method of recovering silver from a chloride bath using mercury amalgam. Unfortunately, this method is not practical because of high toxicity of mercury. Although a method by solvent extraction is conceivable, this is not efficient because the distribution ratio is approximately one at a chlorine concentration of about 6 mol/L.

SUMMARY OF THE INVENTION

An object of the present invention is to provide a method of recovering silver safely and efficiently from a chloride or bromide bath containing various metals, especially from a solution after extraction of copper leached out of copper sulfide ore in a chloride bath.

The inventors have found that silver can be selectively recovered from a chloride bath containing various metals using anion-exchange resin through investigation to achieve the object.

A first aspect in accordance with the present invention provides a method of recovering silver from a hydrochloric acid solution containing alkali and/or alkaline earth metal chloride, silver, copper and iron ions that comprises the steps of (1) bringing the solution into contact with a strong-base anion-exchange resin to adsorb silver, copper, and iron on the anion-exchange resin; (2) then washing the anion-exchange resin with water to remove the adsorbed copper and iron; and (3) then bringing the ion-exchange resin into contact with hydrochloric acid solution to elute the adsorbed silver.

A second aspect in accordance with the present invention provides a method of recovering silver from a hydrochloric acidic solution containing alkali and/or alkaline earth metal chloride, silver, copper and iron ions, and further containing at least one ion selected from the group consisting of zinc, silicon, aluminum, calcium, magnesium, and cobalt that comprises the steps of (1) bringing the solution into contact with a strong-base anion-exchange resin to adsorb silver, copper, iron and zinc on the anion-exchange resin; (2) then washing the anion-exchange resin with water to remove the adsorbed copper, iron, and zinc; and (3) then bringing the ion-exchange resin into contact with hydrochloric acid solution to elute the adsorbed silver.

In one embodiment of the present invention, the concentration of silver in the acidic solution is not more than 30 mg/L, in step (1) the bed volume BV is 10-20 and the space velocity SV is 5 or less; in step (2) the bed volume BV is 7.5 or more and the space velocity SV is 5 or less; and in step (3) the bed volume BV is 10 or more and the space velocity SV is 5 or less.

In another embodiment of the present invention, the chloride ion concentration in the acidic solution is 160 g/L to 200 g/L.

In yet another embodiment of the present invention, the pH of the acidic solution ranges from 0.01 to 1.2.

In yet another embodiment of the present invention, part of the copper is recovered in advance from the acidic solution by solvent extraction.

In yet another embodiment of the present invention, the acidic solution is oxidized prior to the solvent extraction to oxidize at least part of cuprous ions to cupric ions.

In yet another embodiment of the present invention, the acidic solution is a leachate solution obtained by leaching copper ore or copper concentrate with a leach solution containing cupric chloride and/or ferric chloride, followed by solid-liquid separation.

In yet another embodiment of the present invention, the acidic solution further contains alkali metal or/and alkaline earth metal bromide.

EFFECT OF THE INVENTION

The present invention enables to recover silver safely and efficiently from a chloride or bromide bath containing various metals, especially from a solution after extraction of copper leached out of copper sulfide ore in a chloride bath.

DESCRIPTION OF THE PREFERRED EMBODIMENTS

1. Hydrochloric Acid Solution

Figure 2:
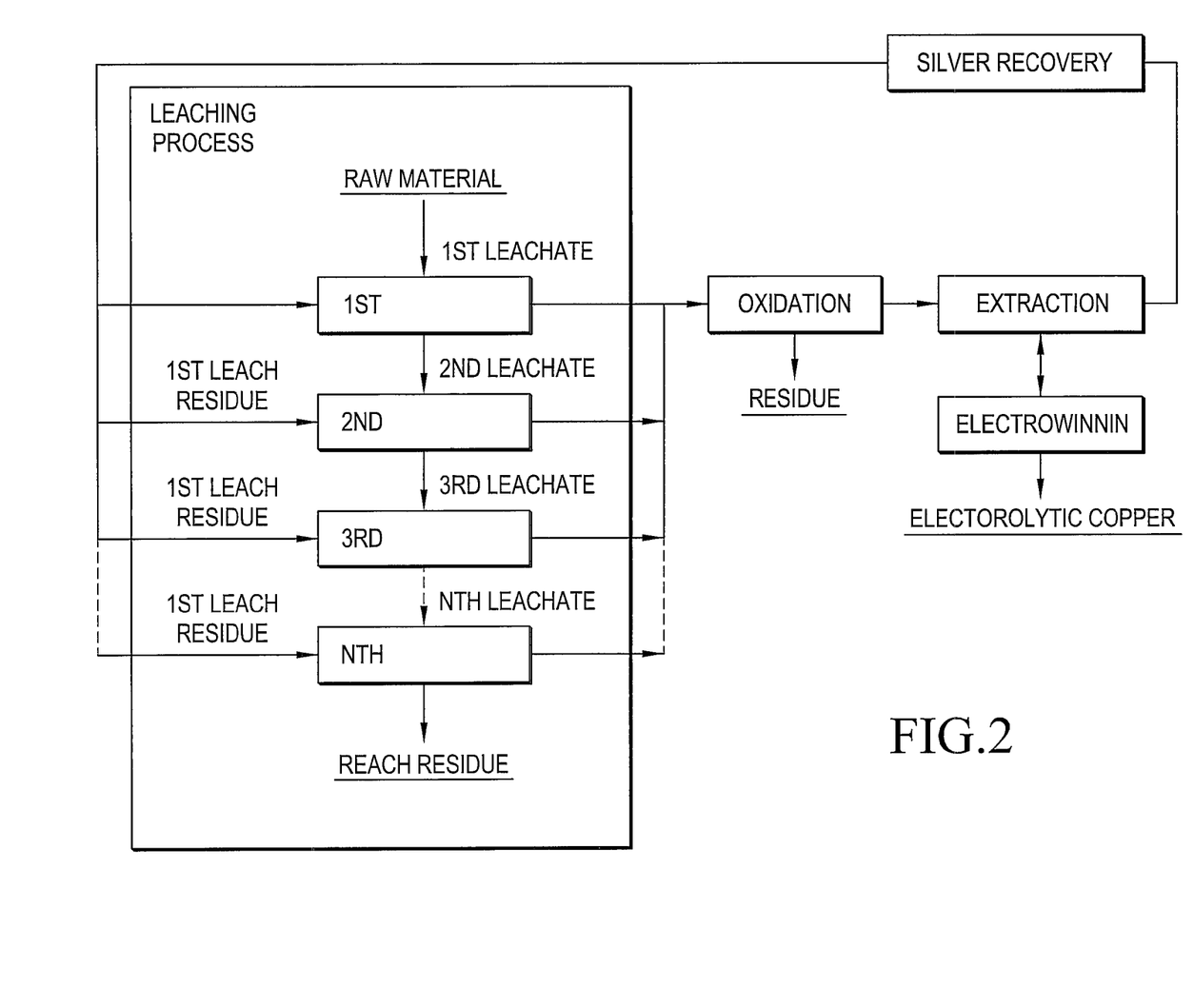
FIG. 2 is a flow sheet illustrating hydrometallurgical treatment for copper sulfide ore.

In the present invention, silver is recovered from a hydrochloric acid solution containing alkali and/or alkaline earth metal chloride, silver, copper and iron ions. In a typical embodiment, the hydrochloric acid solution further contains at least one ion selected from zinc, silicon, aluminum, calcium, magnesium, and cobalt. Probably, silver is present in the form of $AgCl_2^-$ in the hydrochloric acid solution. A hydrochloric acid solution typically intended in the present invention is a leachate solution obtained by leaching copper ore such as copper sulfide ore and copper oxide ore or copper concentrate with a chloride bath containing cupric chloride and/or ferric chloride. In FIG. 2, the present invention is applied at a step shown as "SILVER RECOVERY" in the process that recovers copper from raw material such as copper ore and copper concentrate.

Leaching is a process to recover metals from raw materials such as copper ore (e.g. copper sulfide ore and copper oxide ore) and copper concentrate by dissolving metals such as copper in a chloride bath containing cupric chloride and/or ferric chloride. More particularly, the raw material is added to an acidic solution containing alkali or alkaline earth metal chloride and preferably also bromide and further containing cupric chloride and/or ferric chloride, and then air is blown into the acidic solution under atmospheric pressure at a temperature below the boiling point of the solvent at least for a period of time. For example, copper sulfide ore is added to a mixed solution of cupric chloride, ferric chloride, sodium chloride, and sodium bromide to leach copper, silver and others. Preferably, the concentration of sodium chloride ranges from 160 g/L to 200 g/L (chlorine level) and sodium bromide from 10 g/L to 30 g/L (bromine level), and the temperature of the solution ranges from 70° C. to 85° C. The efficiency of leaching is improved through multiple leaching steps.

Although the concentration of silver in the acidic solution is not limited, the upper limit is desirably 30 mg due to adsorption limit of strong-base anion-exchange resin. Normally, the concentration ranges from about 10 mg/L to about 20 mg/L.

Typically, copper is dissolved in the form of chloride in the acidic solution. When copper ore or copper concentrate, etc. is leached in a chloride bath, leached copper is obtained in the form of chloride. Since adsorption of silver is not inhibited by copper, the concentration of copper in the acidic solution is not limited. Normally, the concentration of copper ranges from about 20 g/L to about 30 g/L. In case of a significantly high concentration of copper in the acidic solution, it is preferred that copper be recovered by the solvent extraction described below, prior to contact with anion-exchange resin to decrease the concentration to the above-mentioned range from a standpoint of recovering copper. In order to enhance the efficiency of solvent extraction, preferably cuprous ions in the acidic solution are oxidized to cupric ions through the oxidation treatment described below.

Typically, iron is also dissolved in the form of chloride in the acidic solution. Since iron is normally contained in copper ore or copper concentrate, etc., leaching by the chloride bath results in a leachate solution containing iron chloride. In some cases, iron chloride is derived from constituents of the chloride bath (e.g. ferric chloride). Iron chloride in the acidic solution may be any of ferrous chloride $FeCl_2$ and ferric chloride $FeCl_3$. Since iron does not inhibit adsorption of silver, the concentration of iron in the acidic solution is not limited. Typically, the concentration ranges from about 0 g/L to about 10 g/L, and more typically, the concentration ranges from about 1 g/L to about 10 g/L.

The acidic solution also contains alkali and alkaline earth metal chlorides for leaching the raw material. Specific examples of alkali and alkaline earth metal chloride include lithium chloride, sodium chloride, potassium chloride, rubidium chloride, cesium chloride, francium chloride, beryllium chloride, magnesium chloride, calcium chloride, strontium chloride, barium chloride, radium chloride. In view of cost and solubility of the reagents, typically usable are sodium chloride, potassium chloride, magnesium chloride, and calcium chloride. These alkali and alkaline earth metal chlorides may be contained alone or in combination in the acidic solution.

Although the pH of the leachate solution from copper ore or copper concentrate in a chloride bath after leaching commonly ranges from about 0.5 to about 2, the pH of the acidic solution used in the present invention typically ranges from about 0.01 to about 1.2, due to the foregoing solvent extraction. Such a pH range is preferred, because a significantly low pH reduces the extraction ability.

Typically, the acidic solution contains chloride ions at a total concentration of 160 g/L to 200 g/L, and more typically 175 g/L to 185 g/L. This is because the concentration of chloride ions in the chloride bath preferably falls within the above range from a standpoint of leaching efficiency. As described above, the intended target in the present invention is a leachate solution obtained by leaching copper ore or copper concentrate such as copper sulfide ore and copper oxide ore in a chloride bath. The above range of the concentration of chloride ions is preferable, since a higher concentration leads to a reduction in extraction ability during solvent extraction.

In some cases, the acidic solution may contain bromide ions, since bromide ions are added in certain instances in the chloride bath for leaching copper to decrease the redox potential, accelerate the reaction, and shorten the reaction time. Typically, bromide ions are derived from, but not limited to, alkali or alkaline earth metal bromide. In case where the acidic solution contains bromide ions, the acidic solution typically contains chloride ions and bromide ions at a total concentration of 120 g/L to 200 g/L.

2. Oxidation

In order to enhance the efficiency of solvent extraction, preferably at least part of cuprous ions in the acidic solution are oxidized to cupric ions, and more preferably substantially all the ions are oxidized. For example, the temperature of the solution is maintained at 60° C. to 80° C. for oxidation, while air is blown at 0.2 L/min to 0.5 L/min for 1 L of acidic solution, so that the reaction terminates in about 5 to 7 hours later.

3. Solvent Extraction

The solvent extraction may be conducted according to any conventional process. For example, the acidic solution (i.e. aqueous phase) is brought into contact with cation-exchange extractant (i.e. organic phase), typically by stirring with a mixer, so that copper ions react with the extractant. Preferably, the solvent extraction is conducted at normal temperature (i.e. 15° C. to 25° C.) to 60° C. under atmospheric pressure to avoid deterioration of the extractant. Using a settler, the mixed organic phase and aqueous phase are separated by means of the difference in the specific gravity. Through the solvent extraction, the concentration of copper in the acidic solution can be reduced, for example, from about 20-30 g/L before extraction to about 15-25 g/L after extraction.

The cation-exchange extractant can be used without restriction, provided that copper can be solvent-extracted from the acidic solution. Examples of the cation-exchange extractant include water-insoluble organic compounds having carboxyl groups or hydroxyl groups, and more particularly, carboxyl acids such as lauric acid and naphthenic acid, and organophosphoric acids such as 2-ethylhexylphosphoric acid (DEHPA), 2-ethylhexylphosphoric acid mono-2-ethylhexyl ester (EFPA-EHE), mono-alkylphosphoric acids, dialkylphosphoric acids, and alkylpyrophospholic acids.

However, preferable cation-exchange extractants are acidic chelate extractants such as aldoxime and ones primarily composed of aldoxime. More particularly, products by Henkel AG & Co. such as LIX84, LIX860, and LIX984 (trade names) prepared from 2-hydroxy-5-nonylacetophenone oxime, 5-dodecyl salicylaldoxime, and 5-nonylsalicylaldoxime and Acorga (trade name) prepared from 5-nonylsalicylaldoxime.

Typically, these extractants are diluted with organic solvents primarily composed of straight-chain hydrocarbons in use.

Preferably, the ratio O/A, i.e. the volume ratio of oil phase to aqueous phase, ranges from 1 to 2.

4. Recovery of Silver (1) Step 1: Adsorption

Silver present in the form of $AgCl_2^-$ in the acidic solution is adsorbed on a strong-base anion-exchange resin through the contact between the acidic solution and the anion-exchange resin, typically by feeding the acidic solution through a column packed with the strong-base anion-exchange resin. Copper, iron, and zinc, if present, dissolved in the acidic solution, are also adsorbed on the anion-exchange resin at the same time. Meanwhile, since silicon, aluminum, calcium, magnesium, and cobalt dissolved in the acidic solution are not adsorbed on the anion-exchange resin, these elements can be separated even if they are present. The acidic solution discharged from the column can be recycled to the leaching step.

The reason for the use of anion-exchange resin is that the dissolved silver to be recovered is believed to be present in the anionic form of $AgCl_2^-$. The reason for the use of strong-base is that the anion, i.e. $Cl^-$ in the resin is believed to be readily detached by ion-exchange for $AgCl_2^-$. Examples of the strong base anion-exchange resin include ones having trimethylammonium groups (i.e. Type I) and ones having dimethylethanolammonium groups (i.e. Type II). In a standpoint of the adsorption efficiency of silver, Type I is preferred. The anion-exchange resins are classified into a porous type and a gel type. Typically, the porous type is used.

The condition of Step 1 may vary depending on the concentration of silver in the acidic solution. In case of a concentration of silver not more than 30 mg/L, the bed volume BV, i.e. the volume of fed liquid divided by the volume of the resin, which indicates the number of times of the volume of fed liquid per volume of resin, is controlled to preferably 10 to 20. For preferable adsorption, the space velocity SV, i.e. a flow rate divided by the volume of resin, is preferably 5 or less.

(2) Step 2: Water Washing

After Step 1, the anion-exchange resin is water-washed. At this time, the adsorbed copper, iron, and zinc, if present, are eluted from the anion-exchange resin, while the adsorbed silver remains on the resin. Preferably, the resin is water-washed until copper, iron, and zinc are completely removed. For example, the resin may be water-washed at a bed volume BV of 7.5 or more and a space velocity SV of 5 or less. Typically, the washing water discharged from the column is sent to a drainage system.

(3) Step 3: Elution of Silver

Subsequently, the anion-exchange resin is brought into contact with hydrochloric acid solution so that the adsorbed silver is eluted. Since the other metal elements are previously eluted from the anion-exchange resin, silver can be extracted substantially alone. In Step 3, preferably eluting is conducted until the adsorbed silver on the anion-exchange resin is completely washed out for achieving a high recovery rate. For example, in this step, the bed volume BV may be controlled to 10 or more and the space velocity SV of 5 or less. In addition, the concentration of chloride ions in the acidic solution is preferably 5 M or more, more preferably 6 M or more, and typically 5-10 M.

(4) Step 4: Water Washing

After the recovery of silver, it is preferred to wash the anion-exchange resin with water once again for reuse.

EXAMPLES

Although examples of the present invention are described below, the invention is not limited to these examples.

A liquid before adsorption contained cupric chloride at a copper concentration of 20.1 g/L; ferric chloride at an iron concentration of 1.7 g/L; copper chlorides, hydrochloric acid, iron chlorides, and sodium chloride at a total chloride ion concentration of 170 g/L; and sodium bromide at a bromide ion concentration of 21 g/L, and had a pH of 0.1. This liquid (900 mL) was used as a test liquid processed for silver-recovering test. The liquid contained dissolved silver of 13 mg/L. The concentrations of dissolved metal elements are shown in Table 1. The concentration of silver was measured by ICP-MS and the other metals by ICP.

TABLE 1

| | Metal element | | | | | | | |
|---|---|---|---|---|---|---|---|---|
| | Cu | Fe | Ag | Zn | Si | Al | Ca | Mg | Co |
| Concentration | 20.1 g/L | 1.7 g/L | 13 mg/L | 140 mg/L | 140 mg/L | 140 mg/L | 650 mg/L | 280 mg/L | 400 mg/L |

The test liquid was fed onto 60 mL of trimethylammonium-group-containing porous strong-base anion-exchange resin PA-312 (trade name) made by Mitsubishi Chemical Corporation at SV=5 hr$^{-1}$. Prior to the feed of the test liquid, the anion-exchange resin had been immersed in deionized water in a column to prevent the resin from drying. The white color of the anion-exchange resin turned brownish after the resin came into contact with the test liquid. The sampling of the test liquid was initiated at the outlet of the ion-exchange resin after the test liquid flowing downwards through the anion-exchange resin changed to blue at the bottom of the resin. After 900 mL of test liquid (BV=15) flowed, the ion-exchange resin was washed with water (BV=7.7, SV=5). Subsequently, the elution was conducted with a 6 N HCl solution (BV=10, SV=5). Finally, the ion-exchange resin was washed with water once again (BV=5, SV=5).

Figure 1:
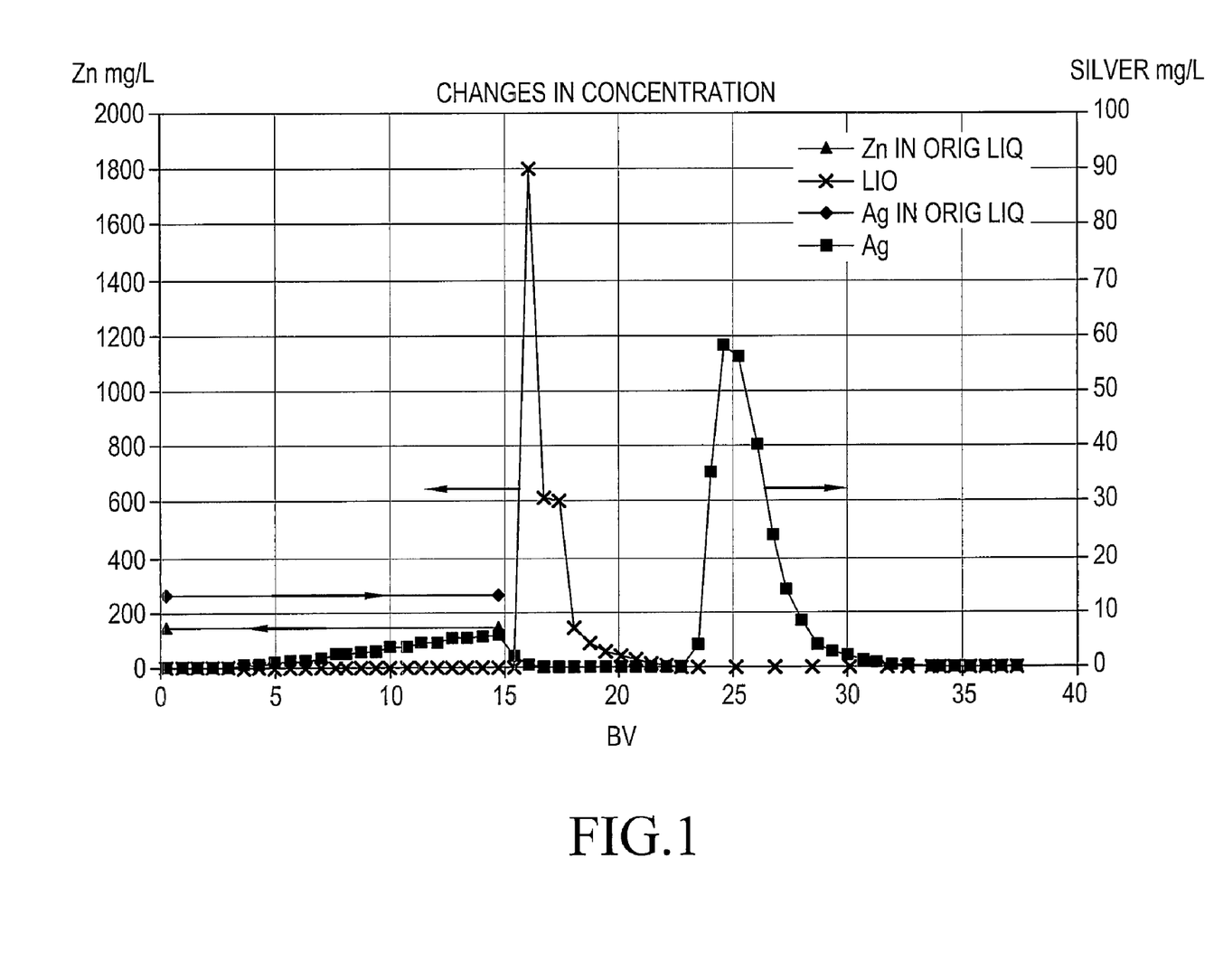
FIG. 1 is a graph illustrating changes in concentration of silver and zinc in a solution passing through ion-exchange resin in Example.

FIG. 1 illustrates a change in concentration of silver in the sampled liquid. The concentration of silver is zero at the beginning and increases in a linear manner in midstream. The concentration drops abruptly to 0 mg/L at BV=15 at the completion of feed of the test liquid. During water washing, the concentration of silver remains at 0 mg/L. Next, elution with 6 N HCl starting at BV=22.7 causes a peak concentration of silver. The elution curve of the peak substantially ends at BV=32.7 before water washing after the elution.

Meanwhile, FIG. 1 shows that the zinc concentration in the test liquid varies from original 140 ppm to 0 mg/L at the outlet. It is therefore believed that zinc is adsorbed on the ion-exchange resin. However, the adsorbed zinc is almost completely eluted during subsequent water washing. Although the elution of silver with 6 M hydrochloric acid starts at BV=22.7, the elution of zinc almost ends at this time.

Figure 3:
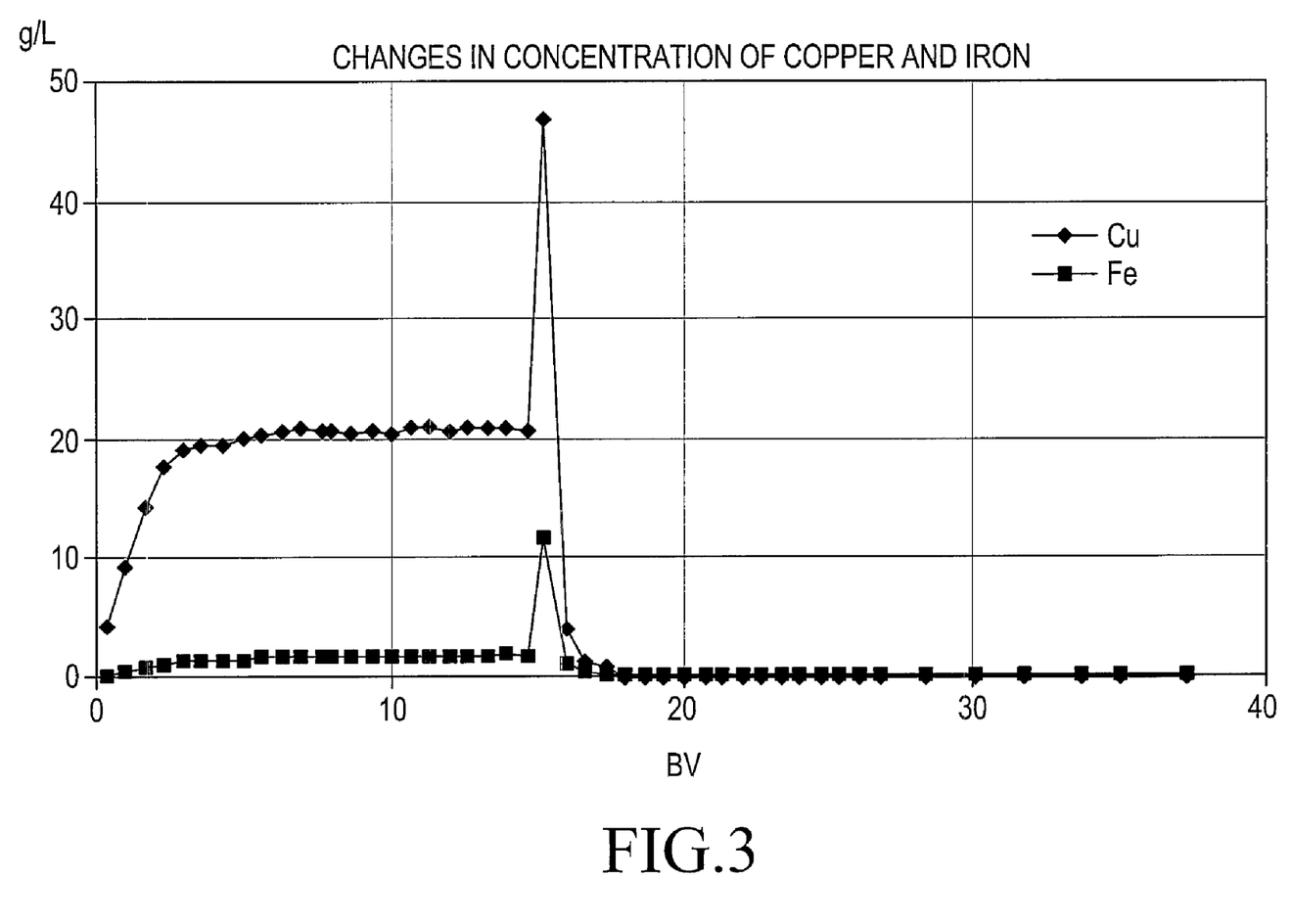
FIG. 3 is a graph illustrating changes in concentration of Cu and Fe in a solution passing through ion exchange resin in Example.

FIG. 3 illustrates the changes in the concentration of copper and iron in the sampled liquid. The concentrations of copper and iron slightly decrease at the outlet in the initial stage of the feed of the test liquid onto the ion-exchange resin, suggesting adsorption of copper and iron on the ion-exchange resin. The peaks of concentrations of copper and iron are observed at BV=15.4 immediately after the start of water washing. Silver is eluted at BV=22.7-32.7, during which the concentrations of copper and iron are each nearly 0 ppm.

Figure 4:
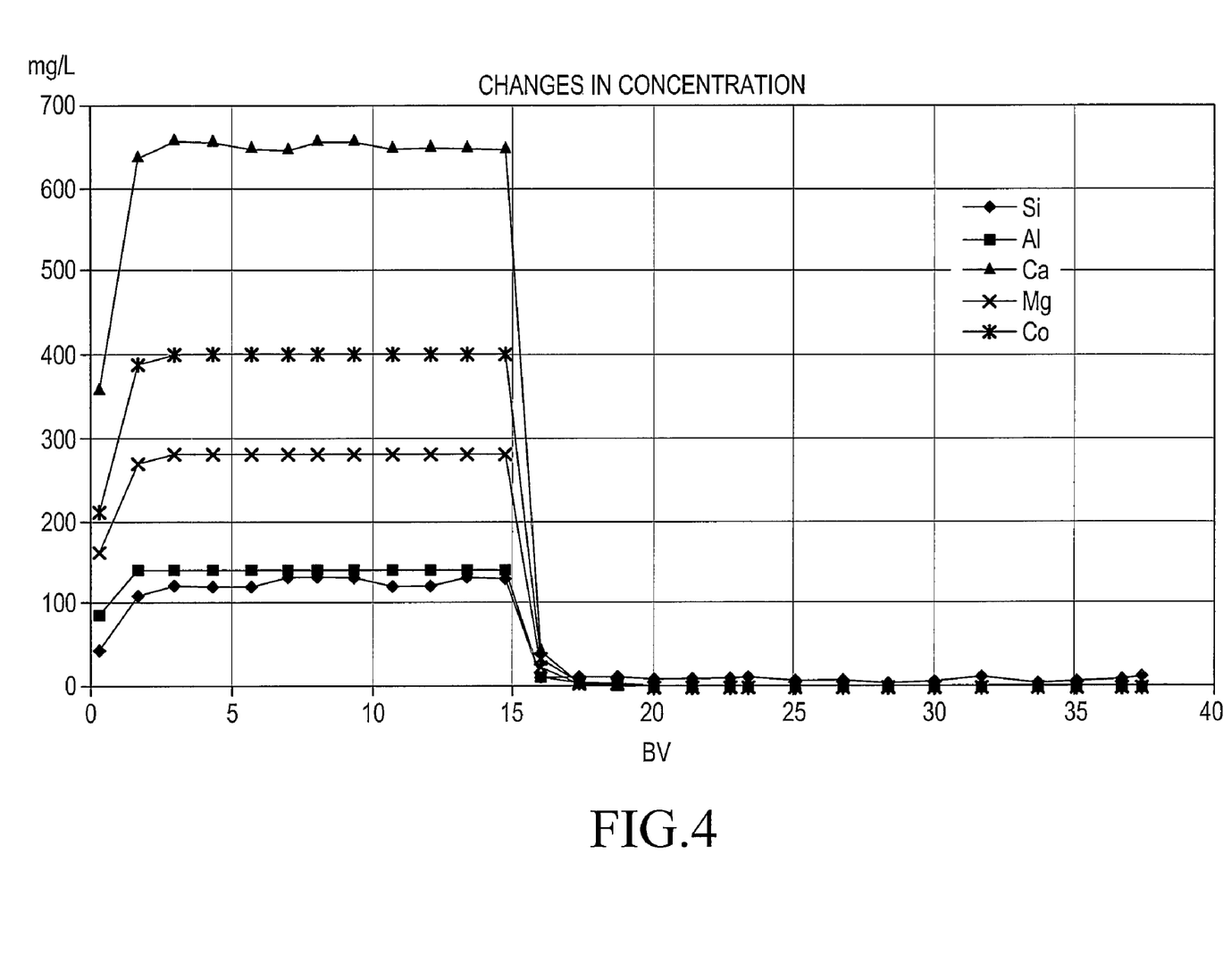
FIG. 4 is a graph illustrating changes in the concentration of Si, Al, Ca, Mg, and Co in a solution passing through ion-exchange resin in Example.

FIG. 4 illustrates the changes in the concentrations of other elements (i.e. Si, Al, Ca, Mg, and Co) in the sampled liquid. The concentration of each element is kept constant after the initial stage of dilution with pure water in the resin column. After switching the test liquid to washing water at BV=15, the concentration immediately reaches nearly 0 ppm. The results demonstrate that these elements were not adsorbed on the ion-exchange resin.

As shown in FIGS. 1, 3, and 4, silver is eluted at BV=22.7-32.7, during which the concentrations of other elements are each nearly zero. Accordingly, the recovered solution contains silver with small amounts of impurities. The accumulated amount of the adsorbed silver for 900 mL of process liquid at BV=15 was 9.4 mg, and silver eluted by 6 M hydrochloric acid during the period from the starting point at BV=22.7 to the end point at BV=32.7 was 10.0 mg. This showed that nearly 100% of silver was eluted.

What is claimed is:

1. A method of recovering silver from a hydrochloric acid solution containing alkali and/or alkaline earth metal chloride, silver, copper and iron ions, comprising the steps of:
    (1) bringing the solution into contact with a strong-base anion-exchange resin to adsorb silver, copper, and iron on the anion-exchange resin;
    (2) then washing the anion-exchange resin with water to remove the adsorbed copper and iron; and
    (3) then bringing the ion-exchange resin into contact with a hydrochloric acid solution to elute the adsorbed silver.

2. The method according to claim 1, wherein the concentration of silver in the acidic solution is not more than 30 mg/L,
    in step (1), the bed volume BV is 10-20 and the space velocity SV is 5 or less;
    in step (2), the bed volume BV is 7.5 or more and the space velocity SV is 5 or less; and
    in step (3), the bed volume BV is 10 or more and the space velocity SV is 5 or less.

3. The method according to any one of claim to 2, wherein the chlorine concentration in the acidic solution is 160 g/L to 200 g/L.

4. The method according to claim 2, wherein the pH of the acidic solution ranges from 0.01 to 1.2.

5. The method according to claim 2, wherein part of the copper is recovered in advance from the acidic solution by solvent extraction.

6. The method according to claim 1, wherein the chlorine concentration in the acidic solution is 160 g/L to 200 g/L.

7. The method according to claim 6, wherein the pH of the acidic solution ranges from 0.01 to 1.2.

8. The method according to claim 6, wherein part of the copper is recovered in advance from the acidic solution by solvent extraction.

9. The method according to claim 1, wherein the pH of the acidic solution ranges from 0.01 to 1.2.

10. The method according to claim 9, wherein part of the copper is recovered in advance from the acidic solution by solvent extraction.

11. The method according to claim 1, wherein part of the copper is recovered in advance from the acidic solution by solvent extraction.

12. The method according to claim 11, wherein the acidic solution is oxidized prior to the solvent extraction to oxidize at least part of cuprous ions to cupric ions.

13. The method according to claim 1, wherein the acidic solution is a leachate solution obtained by leaching copper ore or copper concentrate with a leach solution containing cupric chloride and/or ferric chloride, followed by solid-liquid separation.

14. The method according to claim 1, wherein the acidic solution further contains alkali metal and/or alkaline earth metal bromide.

15. A method of recovering silver from a hydrochloric acid solution containing alkali and/or alkaline earth metal chloride, silver, copper and iron ions, and further containing at least one ion selected from the group consisting of zinc, silicon, aluminum, calcium, magnesium, and cobalt, comprising the steps of:
    (1) bringing the solution into contact with a strong-base anion-exchange resin to adsorb silver, copper and iron on the anion-exchange resin, and when zinc is present, the zinc is adsorbed on the anion-exchange resin;

(2) then washing the anion-exchange resin with water to remove the adsorbed copper, iron, and zinc; and (3) then bringing the ion-exchange resin into contact with a hydrochloric acid solution to elute the adsorbed silver.

16. The method according to claim 15, wherein the concentration of silver in the acidic solution is not more than 30 mg/L, in step (1), the bed volume BV is 10-20 and the space velocity SV is 5 or less;

in step (2), the bed volume BV is 7.5 or more and the space velocity SV is 5 or less; and in step (3), the bed volume BV is 10 or more and the space velocity SV is 5 or less.

17. The method according to any one of claim to 15, wherein the chlorine concentration in the acidic solution is 160 g/L to 200 g/L.

18. The method according to claim 15, wherein the pH of the acidic solution ranges from 0.01 to 1.2.

19. The method according to claim 15, wherein part of the copper is recovered in advance from the acidic solution by solvent extraction.

20. The method according to claim 15, wherein the acidic solution is oxidized prior to the solvent extraction to oxidize at least part of cuprous ions to cupric ions.

* * * * *

UNITED STATES PATENT AND TRADEMARK OFFICE
CERTIFICATE OF CORRECTION

PATENT NO. : 8,206,595 B2
APPLICATION NO. : 12/400636
DATED : June 26, 2012
INVENTOR(S) : Hiroshi Hiai et al.

It is certified that error appears in the above-identified patent and that said Letters Patent is hereby corrected as shown below:

ON THE TITLE PAGE:

At item (73), Assignee, change:

"(73) Assignee: JX Nippon Mining & Metals, Tokyo (JP)"
to

--(73) Assignee: JX Nippon Mining & Metals Corporation, Tokyo (JP)--.

Signed and Sealed this
Fifth Day of February, 2013

Teresa Stanek Rea
*Acting Director of the United States Patent and Trademark Office*